United States Patent
Svendsen et al.

(10) Patent No.: US 9,008,634 B2
(45) Date of Patent: Apr. 14, 2015

(54) SYSTEM AND METHOD FOR PROVIDING MEDIA CONTENT SELECTIONS

(75) Inventors: Hugh Svendsen, Chapel Hill, NC (US); Eugene Farrelly, Cary, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 2581 days.

(21) Appl. No.: 11/539,366

(22) Filed: Oct. 6, 2006

(65) Prior Publication Data

US 2009/0077160 A1 Mar. 19, 2009

(51) Int. Cl.
*H04M 3/42* (2006.01)
*H04M 3/493* (2006.01)
*G06F 15/16* (2006.01)
*G06F 17/00* (2006.01)
*G06F 17/30* (2006.01)

(52) U.S. Cl.
CPC .... *G06F 17/30867* (2013.01); *G06F 17/30029* (2013.01)

(58) Field of Classification Search
None
See application file for complete search history.

(56) References Cited

U.S. PATENT DOCUMENTS

| | | | |
|---|---|---|---|
| 5,616,876 A | 4/1997 | Cluts | |
| 5,790,426 A | 8/1998 | Robinson | |
| 5,884,282 A | 3/1999 | Robinson | |
| 6,041,311 A | 3/2000 | Chislenko et al. | |
| 6,088,722 A | 7/2000 | Herz et al. | |
| 6,195,657 B1 | 2/2001 | Rucker et al. | |
| 6,317,722 B1 | 11/2001 | Jacobi et al. | |
| 6,456,234 B1 | 9/2002 | Johnson | |
| 6,526,411 B1 | 2/2003 | Ward | |
| 6,675,268 B1 | 1/2004 | DeKoning et al. | |
| 6,853,841 B1 | 2/2005 | St. Pierre | |
| 6,865,600 B1 | 3/2005 | Brydon et al. | |
| 6,882,299 B1 | 4/2005 | Allport | |
| 6,946,988 B2 | 9/2005 | Edwards et al. | |
| 6,970,703 B2 | 11/2005 | Fuchs et al. | |
| 6,990,497 B2 | 1/2006 | O'Rourke et al. | |
| 7,000,188 B1 | 2/2006 | Eustace | |
| 7,020,710 B2 | 3/2006 | Weber et al. | |
| 7,043,477 B2 | 5/2006 | Mercer et al. | |
| 7,075,000 B2 | 7/2006 | Gang et al. | |
| 7,081,579 B2 | 7/2006 | Alcalde et al. | |
| 7,134,040 B2 | 11/2006 | Ayres | |

(Continued)

OTHER PUBLICATIONS

MyStrands Labs: Patent-pending Technologies, http://labs.mystrands.com/patents.html.

(Continued)

*Primary Examiner* — Jinsong Hu
*Assistant Examiner* — William Nealon

(57) ABSTRACT

A system and method using events to traverse a content selection path for the purpose of providing media content selections are provided. In general, events are defined based on one or more stimulus such as, but not limited to, a chronological-based stimulus, a location-based stimulus, a user-based stimulus, a third-party stimulus, or a weather-based stimulus. Each of the events is used to trigger one or more associated content selection paths. A content selection path generally defines a set of media content and a manner of stepping through the defined set of media content. In operation, when an event is detected, the associated content selection path is triggered to step to the next step in the content selection path, thereby identifying the media content selections. Then, according to one embodiment of the present invention, the media content selections are obtained from a remote subscription-based service.

34 Claims, 10 Drawing Sheets

(56) References Cited

U.S. PATENT DOCUMENTS

| | | |
|---|---|---|
| 7,171,018 B2 | 1/2007 | Rhoads et al. |
| 7,218,611 B2 | 5/2007 | Mimura et al. |
| 7,240,106 B2 | 7/2007 | Cochran et al. |
| 7,249,367 B2 | 7/2007 | Bove, Jr. et al. |
| 7,292,588 B2 | 11/2007 | Milley et al. |
| 7,325,043 B1 | 1/2008 | Rosenberg et al. |
| 7,373,109 B2 | 5/2008 | Pohja et al. |
| 7,516,212 B2 | 4/2009 | Nguyen et al. |
| 7,613,736 B2 | 11/2009 | Hicken |
| 2001/0053994 A1 | 12/2001 | Atcheson et al. |
| 2002/0007418 A1 | 1/2002 | Hegde et al. |
| 2002/0032019 A1 | 3/2002 | Marks et al. |
| 2002/0049760 A1 | 4/2002 | Scott et al. |
| 2002/0144259 A1 | 10/2002 | Gutta et al. |
| 2002/0151327 A1 | 10/2002 | Levitt |
| 2002/0166123 A1 | 11/2002 | Schrader et al. |
| 2002/0168938 A1 | 11/2002 | Chang |
| 2002/0173273 A1 | 11/2002 | Spurgat et al. |
| 2002/0174243 A1 | 11/2002 | Spurgat et al. |
| 2002/0174426 A1 | 11/2002 | Gutta et al. |
| 2002/0194260 A1 | 12/2002 | Headley et al. |
| 2002/0194619 A1 | 12/2002 | Chang et al. |
| 2003/0014759 A1 | 1/2003 | Van Stam |
| 2003/0093790 A1* | 5/2003 | Logan et al. ............... 725/38 |
| 2003/0147624 A1 | 8/2003 | Trajkovic et al. |
| 2003/0182315 A1 | 9/2003 | Plastina et al. |
| 2003/0204439 A1 | 10/2003 | Cullen, III |
| 2003/0217102 A1 | 11/2003 | Jystad et al. |
| 2003/0225834 A1 | 12/2003 | Lee et al. |
| 2003/0227478 A1 | 12/2003 | Chatfield |
| 2003/0229900 A1 | 12/2003 | Reisman |
| 2003/0236843 A1 | 12/2003 | Weber et al. |
| 2004/0002938 A1 | 1/2004 | Deguchi |
| 2004/0031058 A1 | 2/2004 | Reisman |
| 2004/0055014 A1 | 3/2004 | Edelson |
| 2004/0057348 A1 | 3/2004 | Shteyn et al. |
| 2004/0078382 A1 | 4/2004 | Mercer et al. |
| 2004/0086120 A1 | 5/2004 | Akins, III et al. |
| 2004/0119894 A1 | 6/2004 | Higgins et al. |
| 2004/0133914 A1 | 7/2004 | Smith et al. |
| 2004/0162830 A1 | 8/2004 | Shirwadkar et al. |
| 2004/0181604 A1* | 9/2004 | Immonen ............... 709/232 |
| 2004/0205028 A1 | 10/2004 | Verosub et al. |
| 2004/0246372 A1 | 12/2004 | Megeid |
| 2004/0249708 A1 | 12/2004 | Jacobs et al. |
| 2004/0255340 A1 | 12/2004 | Logan |
| 2004/0267899 A1 | 12/2004 | Rahman et al. |
| 2005/0021470 A1 | 1/2005 | Martin et al. |
| 2005/0060264 A1 | 3/2005 | Schrock et al. |
| 2005/0071881 A1 | 3/2005 | Deshpande |
| 2005/0091693 A1 | 4/2005 | Amine et al. |
| 2005/0113946 A9 | 5/2005 | Janik |
| 2005/0120373 A1 | 6/2005 | Thomas et al. |
| 2005/0165888 A1 | 7/2005 | Elliott |
| 2005/0187976 A1 | 8/2005 | Goodman et al. |
| 2005/0210507 A1 | 9/2005 | Hawkins et al. |
| 2005/0234995 A1* | 10/2005 | Plastina et al. ............. 707/104.1 |
| 2005/0240494 A1 | 10/2005 | Cue et al. |
| 2005/0251453 A1 | 11/2005 | Lu |
| 2005/0251565 A1 | 11/2005 | Weel |
| 2005/0251566 A1 | 11/2005 | Weel |
| 2005/0251576 A1 | 11/2005 | Weel |
| 2005/0251807 A1 | 11/2005 | Weel |
| 2005/0262204 A1 | 11/2005 | Szeto et al. |
| 2005/0267944 A1 | 12/2005 | Little, II |
| 2006/0020662 A1 | 1/2006 | Robinson |
| 2006/0059260 A1 | 3/2006 | Kelly et al. |
| 2006/0087926 A1 | 4/2006 | Hwang |
| 2006/0135059 A1 | 6/2006 | Hill |
| 2006/0143236 A1 | 6/2006 | Wu |
| 2006/0167576 A1* | 7/2006 | Rosenberg ............... 700/94 |
| 2006/0212444 A1 | 9/2006 | Handman et al. |
| 2006/0218180 A1 | 9/2006 | Bodlaender et al. |
| 2006/0256669 A1 | 11/2006 | Sakuma et al. |
| 2006/0294201 A1 | 12/2006 | Kito et al. |
| 2006/0294212 A1 | 12/2006 | Kikkawa et al. |
| 2007/0025194 A1 | 2/2007 | Morse et al. |
| 2007/0083911 A1 | 4/2007 | Madden et al. |
| 2007/0168388 A1 | 7/2007 | Plastina et al. |
| 2007/0219996 A1 | 9/2007 | Jarvinen |
| 2007/0220552 A1* | 9/2007 | Juster et al. ............... 725/46 |
| 2007/0247979 A1 | 10/2007 | Brillon et al. |
| 2008/0016205 A1 | 1/2008 | Svendsen |
| 2008/0033821 A1 | 2/2008 | Jacobi et al. |
| 2008/0133520 A1 | 6/2008 | Hempleman et al. |
| 2008/0288375 A1 | 11/2008 | Uhrig et al. |
| 2009/0085724 A1 | 4/2009 | Naressi et al. |
| 2009/0315670 A1 | 12/2009 | Naressi et al. |

OTHER PUBLICATIONS

InferNote Documentation, http://www.itweaks.com/infdoc/index.html.
CNN.com Breaking News, http://www.cnn.com/.
Rhapsody Full-length music, videos and more, http://www.rhapsody.com/welcome.html.
Yahoo! Music Unlimited, http://music.yahoo.com/ymu/default.asp.
Billboard Music Charts, http://www.billboard.com/bbcom/index.jsp.
The Weather Channel, http://www.weather.com/.
"Goombah—Preview," http://www.goombah.com/preview.html, printed Jan. 8, 2008, 5 pages.
"Start Listening with Last.fm," http://www.last.fm/, 1 page.
Jeff Mascia et al., "Lifetrak: Music in Tune With Your Life.," copyright 2006 ACM, 11 pages.
Jun Wang et al., "Music Recommender System for Wi-Fi Walkman," No. ICT-2003-01 in the ICT Group Technical Report Series, 23 pages.
"Musicstrands.com Because Music is Social," copyright 2006 MusicStrands, Inc., 2 pages.
"MyStrands for Windows," http://www.mystrands.com/overview.vm, copyright 2003-2007 MediaStrands, Inc., printed Feb. 7, 2007, 3 pages.
"UpTo11.net—Music Recommendations and Search," http://www.upto11.net/, copyright 2005-2006 Upto11.net, printed Feb. 7, 2007, 1 page.
"LAUNCHcast Radio—Yahoo! Messenger," http://messenger.yahoo.com/launch.php, copyright 2007 Yahoo! Inc., printed Nov. 8, 2007, 1 page.
"Pandora Internet Radio—Find New Music, Listen to Free Web Radio," http://www.pandora.com/, copyright 2005-2007 Pandora Media, Inc., printed Feb. 7, 2007, 1 page.
"Apple—iPod classic," http://www.apple.com/ipodclassic/, printed Oct. 26, 2007, 1 page.
"Apple—iPod + iTunes," http://www.apple.com/itunes/, copyright 2007 Paramount Pictures, printed Feb. 7, 2007, 2 pages.
"MSN—Music," http://music.msn.com/help/sync, copyright 2007 Microsoft, printed Nov. 16, 2007, 1 page.
"Napster.co.uk—Napster to Go," http://www.napster.co.uk/ntg.html, copyright 2003-2007 Napster, LLC, printed Nov. 15, 2007, 2 pages.
"Roxio The Boom Box Music and recording reviews—CNET Reviews," http://reviews.cnet.com/music-and-recording/roxio-the-boom-box/4505-3669_7-3141440 . . . , printed Nov. 15, 2007, 4 pages.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.

* cited by examiner

SYSTEM AND METHOD FOR PROVIDING MEDIA CONTENT SELECTIONS

FIELD OF THE INVENTION

The present invention relates to providing media content selections and more specifically relates to providing media content selections based on events.

BACKGROUND OF THE INVENTION

Subscription-based web services providing unlimited access to large amounts of media content have recently emerged. Exemplary subscription-based web services are Yahoo! Unlimited and Real Network's Rhapsody Unlimited music services. However, with access to these large collections of media content, selection of media content from the large collection of media becomes an issue. More specifically, even though a subscription-based service provides unlimited access to a large collection of media content, a user must still manually select media content to obtain from the subscription-based service. In a similar fashion, selection of content from a large user media collection is also an issue. Thus, there is a need for a system and method for automatically selecting media content from a large collection of media content.

SUMMARY OF THE INVENTION

The present invention provides a system and method using events to traverse a content selection path for the purpose of providing media content selections. In general, events are defined based on one or more stimuli such as, but not limited to, a chronological-based stimulus, a location-based stimulus, a user-based stimulus, a third-party stimulus, or a weather-based stimulus. Each of the events is used to trigger one or more associated content selection paths. A content selection path generally defines a set of media content and a manner of stepping through the defined set of media content. The defined set of media content may be, for example, songs or albums identified by Billboard charts over a defined time period where each step in the content selection path corresponds to all or a portion of the songs or albums from a Billboard chart; albums for a particular artist or group where each step in the content selection path may be one of the albums; groups of songs for each of a number of genres where each step in the content selection path may be the group of songs for one of the genres; or a number of predefined lists of content where each step in the content selection path may be one of the predefined lists. Thus, for example, a content selection path may be defined to step through the Billboard charts from the 1980s each time the path is triggered by one or more associated events. In operation, when an event is detected, the associated content selection path is triggered to step to the next step in the content selection path, thereby identifying the media content selections. Then, according to one embodiment of the present invention, the media content selections are obtained from a remote subscription-based service.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
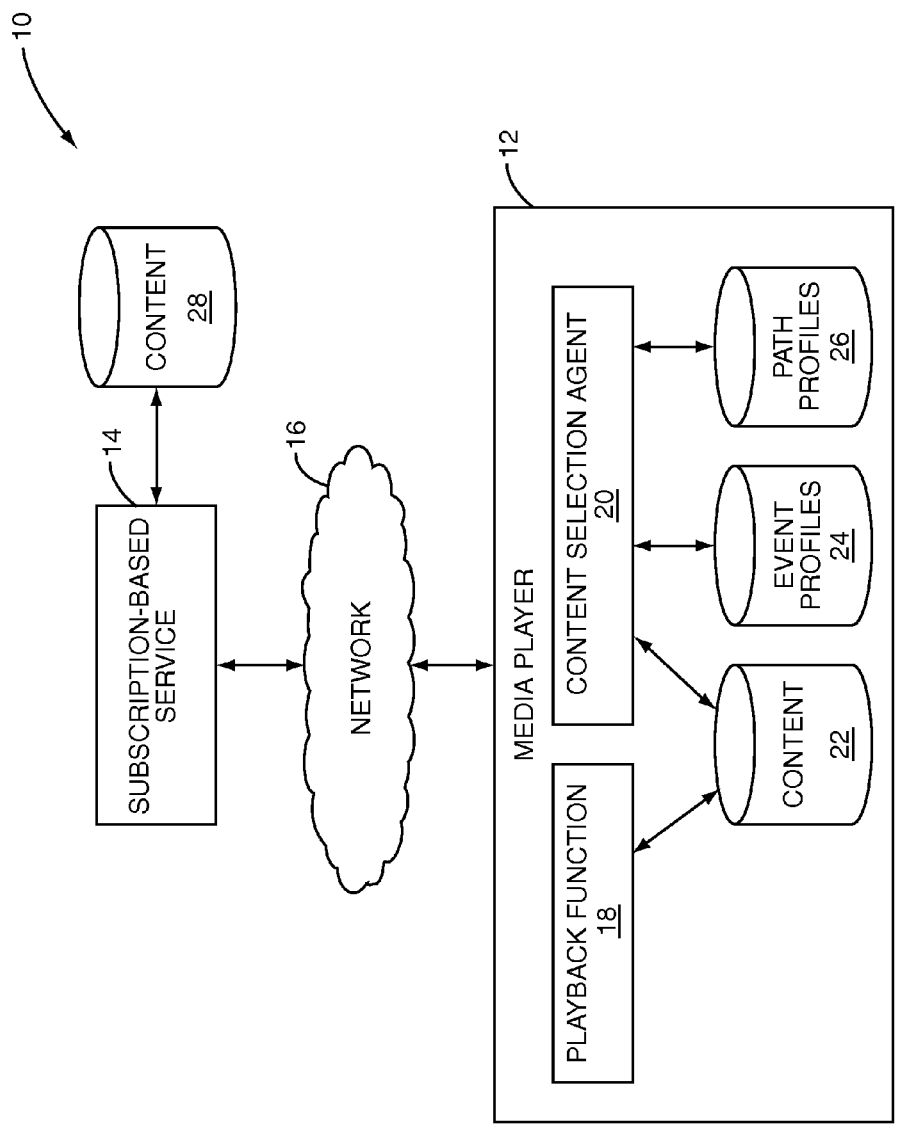
FIG. 1 illustrates a system according to one embodiment of the present invention.

FIG. 1 illustrates a system 10 wherein events are used to traverse a content selection path for the purpose of selecting media content according to one embodiment of the present invention. Generally, the system 10 includes a media player 12 and a subscription-based service 14 communicatively coupled by a network 16. The network 16 may be, for example, a Wide Area Network (WAN), a Local Area Network (LAN), or a combination thereof. In one embodiment, the network 16 may be a public distributed network such as the Internet, a cellular network, or a combination thereof.

It should be noted that while the discussion herein focuses on providing music selections, the present invention is not limited thereto. The present invention is equally applicable to other types of media content such as movies, television programs, or the like.

The media player 12 may be any media playback device capable of connecting to the network 16. For example, the media player 12 may be a portable media player such an Apple iPod or a MusicGremlin portable media player, a personal computer, a Personal Digital Assistant (PDA), a mobile telephone, or the like. Further, the media player 12 may connect to the network 16 using, for example, a wired connection or a wireless connection. The wireless connection may be a local wireless connection such as that established according to one of the suite of IEEE 802.11 standards, the Bluetooth standard, or the like, or a cellular connection such as that established according to the Global System for Mobile Communications (GSM) standard, the 3G Wideband Code Division Multiple Access (W-CDMA) standard, or the like.

The media player 12 generally includes a playback function 18 and a content selection agent 20. The media player 12 also operates to store a content database 22, an event profiles database 24, and a path profiles database 26, which may be stored in one or more digital storage devices such as, but not limited to, one or more hard disk drives, one or more optical storage devices, memory, or the like. The playback function 18 may be implemented in software, hardware, or a combination of software and hardware and operates to play media content stored in the content database 22. The content selection agent 20 may be implemented in software, hardware, or a combination of software and hardware. As discussed below, the content selection agent 20 generally operates to detect events and, in response, traverse associated content selection paths for the purpose of selecting media content. Then, in this embodiment, the content selection agent 20 obtains the selected media content, or at least a portion of the selected media content not already stored in the content database 22, from the subscription-based service 14. Alternatively, the selected media content may be purchased from an e-commerce service.

The content database 22 operates to store media content. In the preferred embodiment, the content database 22 operates to store a number of songs previously downloaded to or otherwise stored on the media player 12. However, in addition or alternatively, the content database 22 may store other media content such as movies and television programs.

The event profiles database 24 operates to store event profiles defining a number of events used to traverse, or trigger, associated content selection paths. For a particular event, the event is based on one or more stimuli. Thus, the corresponding event profile includes information identifying one or more stimuli and optionally one or more conditional statements defining the event. A stimulus may be, for example, a chronological-based stimulus, location-based stimulus, user-based stimulus, network-based stimulus, third-party stimulus, weather-based stimulus, or the like.

A chronological-based stimulus may be time of day, day of week, month, season of the year, or the like. A location-based stimulus may be a current location of the media player 12. For example, the current location of the media player 12 may be obtained from an associated Global Positioning System (GPS) receiver or the like. Alternatively, the media player 12 may obtain the current location of the media player 12 from a remote system or device such as, but not limited to, a base station of an associated cellular network or a nearby local wireless device. A user-based stimulus may be usage metrics such as a play history, user identity, user heart rate, user respiration rate, user activity, or the like. Note that user identity may be input by the user of the media player 12 or detected using a biometric technique. A user activity may be detected based on a known schedule for the user and the current date and time.

A network-based stimulus may be network connection status, a bandwidth or speed of the network connection, or the like. A third-party stimulus may be content availability at the subscription-based service 14, issuance of a news report associated with an artist or musical group, scheduling of a concert, a concert being scheduled for a date that is within a defined range around the current date, or the like. A weather-based stimulus may be temperature, barometric pressure, rain conditions, snow conditions, or the like. The weather-based stimuli may be obtained directly by the media player 12 or obtained from a third-party service such as, for example, the weather.com website. It should be noted that the types of stimuli discussed above are exemplary and are not intended to limit the scope of the present invention. Other types of stimuli will be apparent to one of ordinary skill in the art upon reading this disclosure.

An event may be defined based on one or more stimuli and optionally conditional statements. Thus, for example, an event may be defined such that the event occurs when the current time is 9:00 a.m. As a second example, an event may be defined such that the event is a daily event that occurs the first time that the media player 12 is connected to the network 16 each day. As a third example, an event may be defined as a daily event. As a fourth example, an event may be defined as a seasonal event such that the event occurs at the change of seasons (spring, summer, fall, winter). As a fifth example, an event may be defined based on temperature and weather such that the event occurs when the current temperature is greater than, for example, 90 degrees Fahrenheit and it is sunny outside. As a sixth example, an event may be defined based on location such that the event occurs when the media player 12 is in Las Vegas or at the beach. As a seventh example, an event may be defined as an annual event that occurs on the anniversary of, for example, Woodstock. As an eighth example, an event may be defined based on news reports such that the event occurs when one of a particular group of artists or any artist appears in the news. As a ninth example, an event may be defined based on concert schedules such that the event occurs daily over one or more weeks prior to a concert for a particular artist at a location within a predefined range of the current location of the media player 12. As a tenth example, an event may be defined based on the user's heart rate such that the event occurs when the user's heart rate rises above a predefined threshold.

The path profiles database 26 stores a number of content selection paths. Each content selection path is triggered by one or more of the events defined by the event profiles stored in the event profiles database 24. A content selection path generally defines a set of media content and a manner of stepping through the defined set of media content. The content selection path includes a starting point, an ending point, and either a step size or a number of intermediate points. The defined set of media content may be, for example, songs for albums identified on Billboard charts over a defined time period where each step in the content selection path corresponds to one or more of the Billboard charts during the defined time period; albums for a particular artist or group where each step in the content selection path may be one or more of the albums; defined groups of songs for each of a number of genres where each step in the content selection path may be the defined group of songs for one or more of the genres; a number of predefined lists of content where each step in the content selection path may be one or more of the predefined lists of content; or the like. Thus, for example, a content selection path may be defined to step through the Billboard charts from the 1980s each time the path is triggered by one or more associated events.

Note that the media player 12 may additionally store a database including metadata identifying all or a portion of the media content available via the subscription-based service 14. This database may then be used by the user of the media player 12 or the content selection agent 20 to define content selection paths.

In this embodiment, when an event occurs, one or more associated content selection paths are triggered, thereby providing media selections. For example, a content selection path may be defined to step through the Billboard charts from the 1980s each time the path is triggered by a corresponding event. When the event occurs, the content selection agent 20 may obtain the next Billboard chart in the sequence from a subscription-based service 14, for example, the billboard.com website. Alternatively, the content selection agent 20 may obtain the Billboard charts beforehand and store them locally on the media player 12. The songs or albums on the next Billboard chart are identified as the media content selections. The content selection agent 20 may then obtain all or a portion of the media content selections from the subscription-based service 14. Note that if ones of the media content selections are already stored in the content database 22, the content selection agent 20 may obtain only the ones of the media content selections that are not already stored in the content database 22 from the subscription-based service 14.

The subscription-based service 14 is preferably a web-based service that provides unlimited access to content 28 for a subscription fee, which may be a monthly or yearly fee. The content 28 may be songs, albums, movies, television programs, or the like or any combination thereof. Exemplary subscription-based services 14 include, but are not limited to, Yahoo! Unlimited and Real Network's Rhapsody Unlimited music services.

Figure 2:
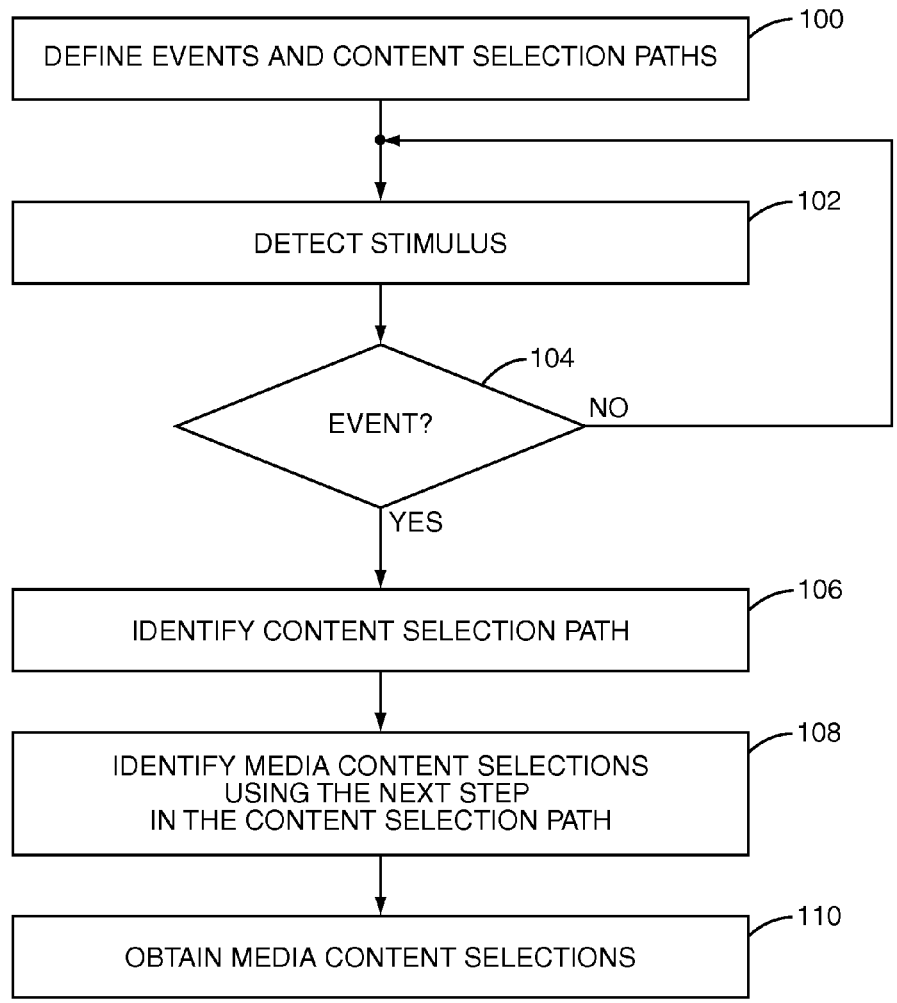
FIG. 2 illustrates the operation of the content selection agent of FIG. 1 according to one embodiment of the present invention.

FIG. 2 illustrates the operation of the content selection agent 20 of FIG. 1 according to one embodiment of the present invention. First, the events and content selection paths are defined (step 100). In one embodiment, both the events and content selection paths are defined by the user of the media player 12. However, the events, content selection paths, or both may alternatively be defined by the system 10. More specifically, the subscription-based service 14 may provide one or more content selection paths and associated events. In addition or alternatively, the content selection agent 20 may automatically provide one or more content selection paths and associated events. Still further, other users in the system 10 may define content selection paths and events for triggering the content selection paths. These content selection paths and events may be provided to the media player 12 in a peer-to-peer fashion or provided to the subscription-based service 14 and obtained by the content selection agent 20. For example, another user in the system 10 may define a content selection path for experiencing music by the Beatles. Each step in the content selection path may include one or more Beatles albums or one or more playlists including songs by the Beatles. An event triggering the Beatles content selection path may also be defined by the other user. As such, the other user may define the order in which the user of the media player 12 experiences Beatles music and how much time is spent listening to each step in the Beatles content selection path.

Next, the content selection agent 20 detects a stimulus or a number of stimuli (step 102). In order to detect stimuli, the content selection agent 20 may, for example, include a clock function providing the current time and date; a GPS receiver for detecting the location of the media player 12; a temperature sensor for detecting the ambient temperature of the environment in which the media player 12 is located; a heart rate sensor for detecting the heart rate of the user of the media player 12; a respiratory rate sensor for detecting the respiratory rate of the user of the media player 12; a function for detecting or maintaining user metrics; a function for determining the identity of the current user of the media player 12; a function for determining a current activity of the user of the media player 12 which may be determined based on, for example, a schedule maintained for the user and the current date and time; a function for communicating with remote services via the network to detect or obtain third-party stimuli such as news reports and concert schedules and to detect or obtain weather based stimuli; or the like. In addition or alternatively, the media player 12 may be associated with one or more peripherals providing stimuli. For example, rather than including a GPS receiver, the media player 12 may be connected to a peripheral GPS device to obtain the location of the media player 12.

Based on a comparison of the stimuli and the event profiles in the event profiles database 24, the content selection agent 20 determines whether an event has occurred (step 104). If an event has not occurred, the process returns to step 102. If an event has occurred, the content selection agent 20 then identifies a content selection path that is to be triggered in response to the event (step 106). Once identified, the content selection agent 20 identifies media content selections using the next step in the content selection path (step 108). In this embodiment, the content selection agent 20 then obtains the media content selections from the subscription-based service 14 (step 110). However, note that if any of the media content selections are already stored on the media player 12, the content selection agent 20 may obtain only the media content selections that are not already stored on the media player 12 from the subscription-based service 14. Further note that if the media player 12 is not currently connected to the network 16, the media player 12 may wait until a connection with the network 16 is re-established before obtaining the media content selections from the subscription-based service 14.

Figure 3:
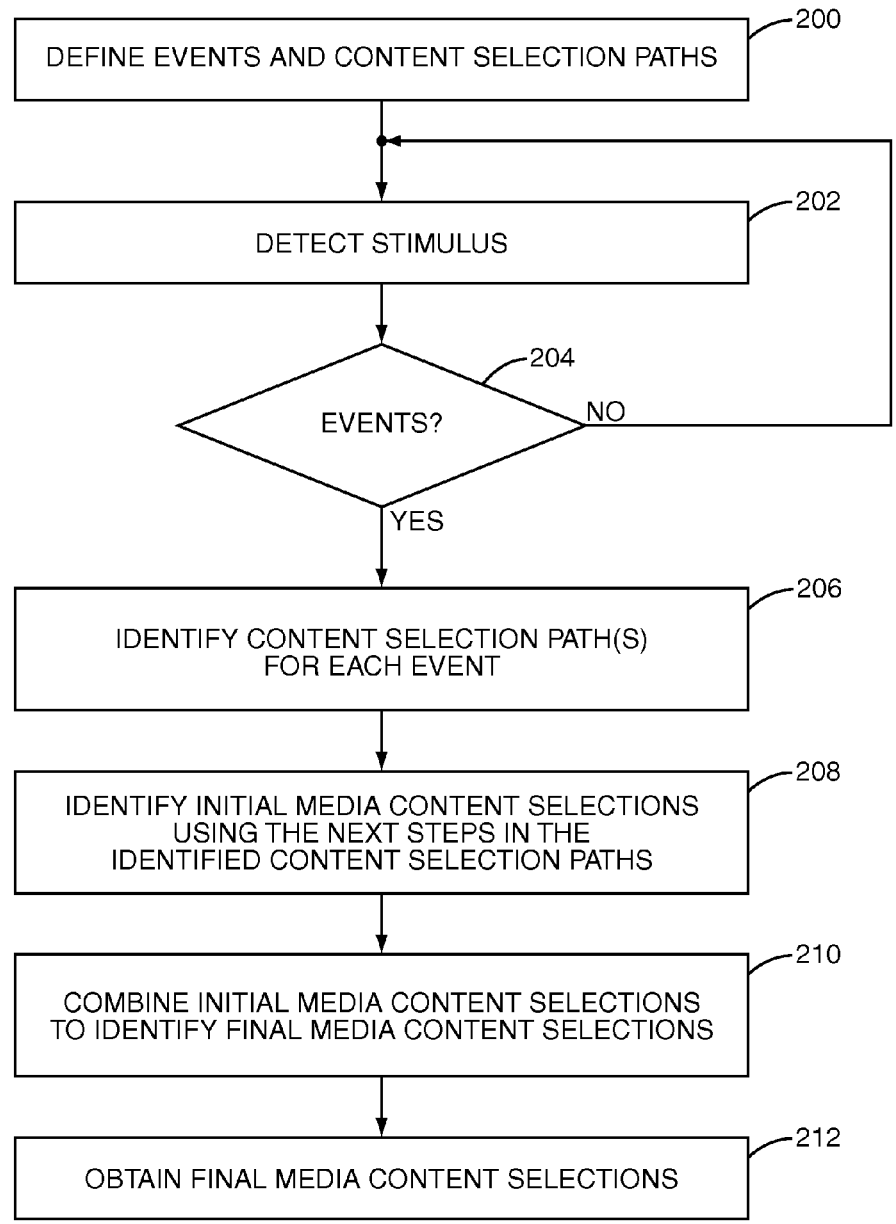
FIG. 3 illustrates the operation of the content selection agent of FIG. 1 according to another embodiment of the present invention.

FIG. 3 is substantially the same as FIG. 2. However, in this embodiment, one or more events may be detected with each event triggering one or more content selection paths. More specifically, the events and associated content selection paths are first defined, as described above (step 200). Next, the content selection agent 20 detects a stimulus or a number of stimuli (step 202). Then, based on a comparison of the stimuli and the event profiles in the event profiles database 24, the content selection agent 20 determines whether any of the events have occurred (step 204). If not, the process returns to step 202. If one or more events have occurred, the content selection agent 20 then identifies one or more content selection paths that are to be triggered in response to the events (step 206). The content selection agent 20 identifies initial media content selections using the next steps in the content selection paths triggered by the detected events (step 208). In this embodiment, the content selection agent 20 then combines the initial media content selections from each of the content selection paths to identify final media content selections (step 210). In one embodiment, the content selection agent 20 may apply one or more condition statements to filter the initial media selections to provide the final media content selections. The condition statements may be conditioned on any of the stimuli discussed herein. Alternatively, the condition statements may be such that the initial media selections are filtered based on a popularity or user rating and/or filtered to remove redundant selections. Note that filtering may be desired in order to limit the selections to a desired number of selections, which may or may not be related to the available storage space on the media player 12.

The content selection agent 20 then obtains the final content selections from the subscription-based service 14 (step 212). However, note that if any of the final media content selections are already stored on the media player 12, the content selection agent 20 may obtain only the final media content selections that are not already stored on the media player 12 from the subscription-based service 14. Further note that if the media player 12 is not currently connected to the network 16, the media player 12 may wait until a connection with the network 16 is re-established before obtaining the final media content selections from the subscription-based service 14.

Figure 4:
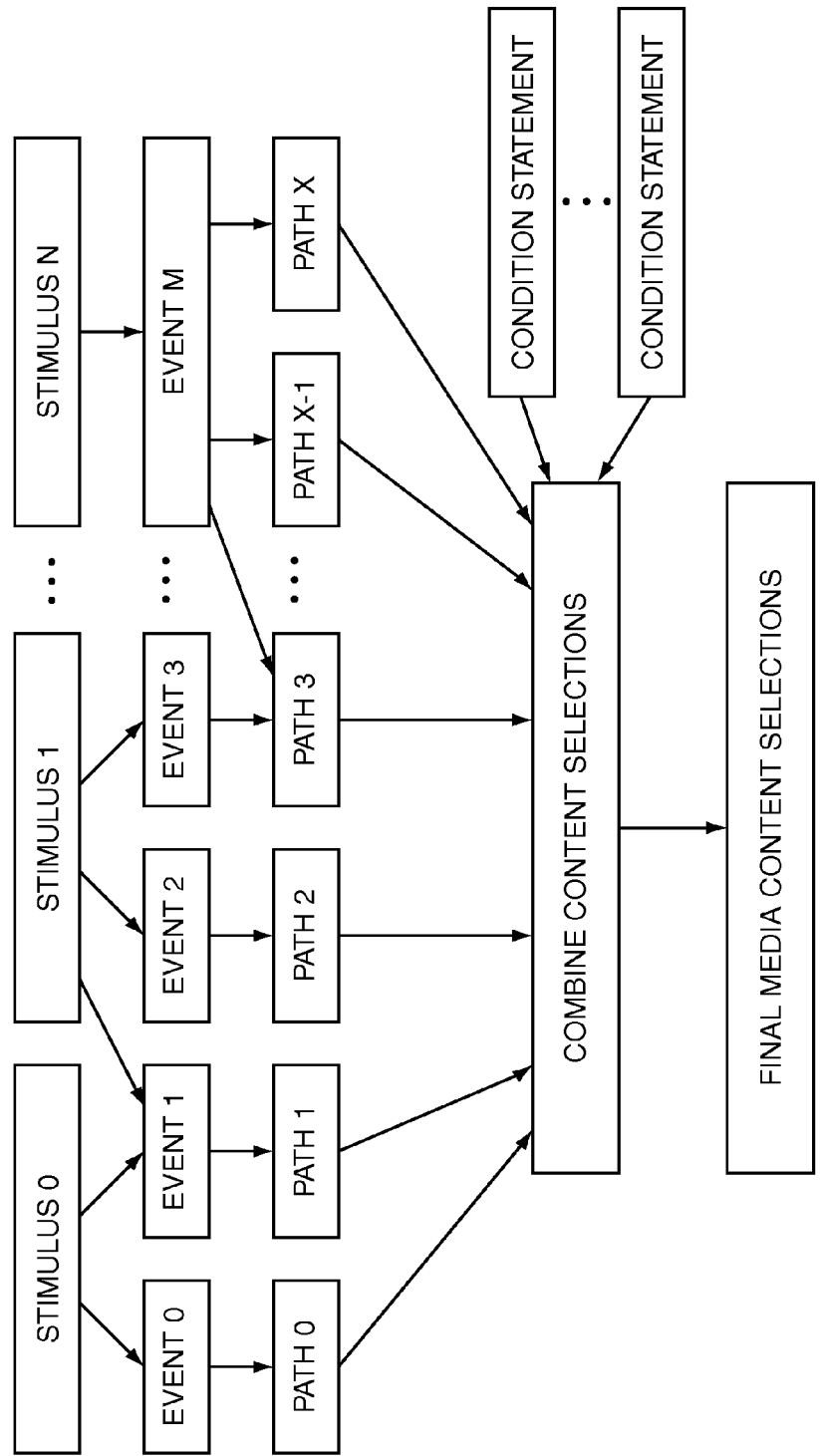
FIG. 4 is a block diagram illustrating the operation of the content selection agent according to the process of FIG. 3.

FIG. 4 is a graphical illustration of the process shown in FIG. 3. As illustrated, in response to a number (N) of stimuli (STIMULUS 0 through STIMULUS N), the content selection agent 20 detects the occurrence of a number (M) of events. For example, events EVENT 0 and EVENT 1 occur in response to the stimulus STIMULUS 0. It should be noted that more than one event may be triggered based on the same stimulus. For example, events EVENT 1 and EVENT 2 are both triggered based on the same stimulus STIMULUS 1.

In response to the occurrence of the events EVENT 0 through EVENT M, the content selection agent 20 triggers a number (X) of associated content selection paths PATH 0 through PATH X. Note that a single event may trigger more than one content selection path. For example, the content selection paths PATH 3, PATH X-1, and PATH X are each triggered by the event EVENT M. Once triggered by the events EVENT 0 through EVENT M, the content selection agent 20 traverses the content selection paths PATH 0 through PATH X to proceed to the next steps in the content selection paths PATH 0 through PATH X, thereby identifying the initial media content selections. In this example, the initial media content selections are combined based on a number of condition statements to provide the final content selections.

In order to ensure a clear understanding of the present invention, a number of examples are provided below. However, it should be noted that the examples provided herein are not intended to limit the scope of the present invention. Other types of stimuli, events, and content selection paths will be apparent to one of ordinary skill in the art upon reading this disclosure.

As a first example, a content selection path may be defined to step through the Billboard charts for a specified time period such as the 1980s. Each of the Billboard charts identifies a number of songs or albums. The content selection path may have a starting point corresponding to a first Billboard chart for 1980 and an ending point corresponding to a last or substantially the last Billboard chart in 1989. Further, the content selection path may be defined to step through each of the Billboard charts, where, for example, the step size may be defined as weekly, monthly, or yearly. The Billboard chart path is triggered by an associated event. For example, the associated event may be a daily event such that the Billboard chart path is triggered daily. Thus, when the daily event occurs, the Billboard chart path is triggered, thereby identifying the songs or albums listed in the next Billboard chart in the path as the media content selections. The content selection agent 20 may obtain the next Billboard chart in the path from, for example, the billboard.com website. Alternatively, the content selection agent 20 may obtain the Billboard charts beforehand and store them locally on the media player 12. The content selection agent 20 may then obtain all or a portion of the media content selections from the subscription-based service 14. Note that if ones of the media content selections are already stored in the content database 22, the content selection agent 20 may obtain only the ones of the media content selections that are not already stored in the content database 22 from the subscription-based server 14.

As a second example, a content selection path may be defined for albums of a particular artist where the events triggering the content selection event are life events in the life of the artist. The life events may be, for example, the birth of a child where the birth of the child may be detected based on a stimulus such as third party news reports; the birthday of the artist where the birthday of the artist may be defined by, for example, the user of the media player 12 or obtained from a remote source; an album release date where the album release date may be obtained from a remote source such as, for example, the subscription-based service 14; an anniversary of an album release date where the anniversary or the album release date may be provided by the user of the media player 12 or provided by a remote source such as, for example, the subscription-based service 14; an arrest of the artist which may be detected based on third-party news reports; the artist being admitted to a medical facility such as a drug or alcohol rehabilitation facility which may be detected based on third-party news reports; or the like. The life events may each be defined as a separate event where each of the events triggers the content selection path. Alternatively, the life events may be combined into a single event. When one of these life events is detected, the content selection path is triggered such that the next album in the path or the songs from the next album in the path is identified as the media content selection. The content selection agent 20 may then obtain all or a portion of the identified album or songs on the identified album from the subscription-based service 14. Note that if ones of the media content selections are already stored in the content database 22, the content selection agent 20 may obtain only the ones of the media content selections not already stored in the content database 22 from the subscription-based server 14.

As a third example, a content selection path may be defined as the albums for a particular artist such as, for example, Eric Clapton. An event triggering the Eric Clapton path may be defined such that the albums are stepped through over the course of a month in the order that the albums were released. In addition, the event may be defined such that the time between steps is proportional to the time between the corresponding release dates. When the event is detected, the Eric Clapton path is triggered such that the next album in the path is provided as the media content selection. The content selection agent 20 may then obtain all or a portion of the songs on the album from the subscription-based service 14.

As a fourth example, a content selection path may be defined for Madonna albums where the first step in the content selection path includes one or more of Madonna's albums released in the 1980s, the second step includes one or more of Madonna's albums released in the 1990s, and the last step includes one or more of Madonna's albums released in the 2000s. An event triggering the Madonna content selection path may be defined to occur on the first day of the month, a tenth day of the month, and a twentieth day of the month. As such, on the first day of the month, the content selection path is triggered to identify the one or more Madonna albums released in the 1980s defined by the first step in the content selection path as the media content selections. In response, the content selection agent 20 may obtain the albums, or a portion thereof, from the subscription-based service 14. On the tenth day of the month, the content selection path is triggered to select the one or more Madonna albums released in the 1990s. On the twentieth day of the month, the content selection path is triggered to select the one or more Madonna albums released in the 2000s.

As a fifth example, a content selection path may be defined as the set lists, or list of songs, to be performed at a number of upcoming concerts. The set lists may be provided by the user of the media player 12 or obtained from a remote source such as, for example, the subscription-based service 14. The event triggering the content selection path may be defined, for example, such that the event occurs when the current date is one day prior to or the day of one of the number of upcoming concerts. When the event occurs, the list of songs for the corresponding concert, which is the next step in the content selection path, are selected as the media content selections.

The content selection agent 20 may then obtain all or a portion of the media content selections from the subscription-based service 14.

As a sixth example, a first content selection path may be defined for albums by Elvis Presley, and a second content selection path may be defined for albums by Wayne Newton. A daily event may be defined to trigger the Elvis Presley content selection path daily when the location of the media player 12 is Las Vegas, the user of the media player 12 is identified as user A, and a network connection is established. A second daily event may be defined to trigger the Wayne Newton content selection path daily when the location of the media player 12 is Las Vegas, the user of the media player 12 is identified as user B, and a network connection is established. As such, when user A is using the media player 12 in Las Vegas, one or more Elvis Presley albums may be obtained by the media player 12 daily. In contrast, when user B is using the media player 12 in Las Vegas, one or more Wayne Newton albums may be obtained by the media player 12 daily.

As a seventh example, a content selection path may be defined for albums by Bob Dylan, Jimi Hendrix, and other artists performing at Woodstock. An event triggering the Woodstock content selection path may be defined as an event occurring annually on the days of August 15, August 16, August 17, and August 18, which is the anniversary of Woodstock. Each time the event occurs, a number of songs or albums from one or more artists who performed at Woodstock are selected and obtained by the content selection agent 20.

As an eighth example, a content selection path may be defined to include a number of playlists including high tempo songs. The playlists may be defined by the user of the media player 12 or by the subscription-based service 14. A event triggering the content selection path may be defined to occur when the heart rate of the user of the media player 12 exceeds a defined threshold. Thus, when the user's heart rate exceeds the threshold, such as when the user is exercising, the content selection path is triggered, thereby selecting the next playlist in the content selection path as the media content selections. The content selection agent 20 then obtains all or a portion of the songs identified by the playlist from the subscription-based service 14.

As a ninth example, a content selection path may be defined as albums by Jimmy Buffet and the Beach Boys. An event triggering the content selection path may be defined as a daily event that occurs when the location of the media player 12 is at a beach, the current temperature is equal to or greater than 85 degrees Fahrenheit, and the weather is sunny. As such, if, for example, the user of the media player 12 is on vacation at the beach during the summer, the content selection agent 20 may obtain one or more Jimmy Buffet and/or Beach Boys albums from the subscription-based service 14 according to the content selection path each day that it is sunny and above 85 degrees.

As a tenth example, a content selection path may be defined where each step in the content selection path includes one or more Christmas albums. The content selection path may be defined by the user of the media player 12 or by, for example, the subscription-based service 14. An event triggering the Christmas content selection path may be defined as a daily or weekly event in the month of December. Thus, using a weekly event as an example, the Christmas content selection path is triggered each week in December to obtain one or more Christmas albums from the subscription-based service 14 according to the Christmas content selection path.

As an eleventh example, a content selection path for albums by Madonna may be defined. An event triggering the Madonna content selection path may be defined as a news event that occurs each time Madonna appears in the news. For example, the content selection agent 20 may monitor articles published on CNN's website to determine when Madonna appears in the news. When the event occurs, the Madonna content selection path is triggered such that the next album in the content selection path is selected and obtained from the subscription-based service 14.

Figure 5:
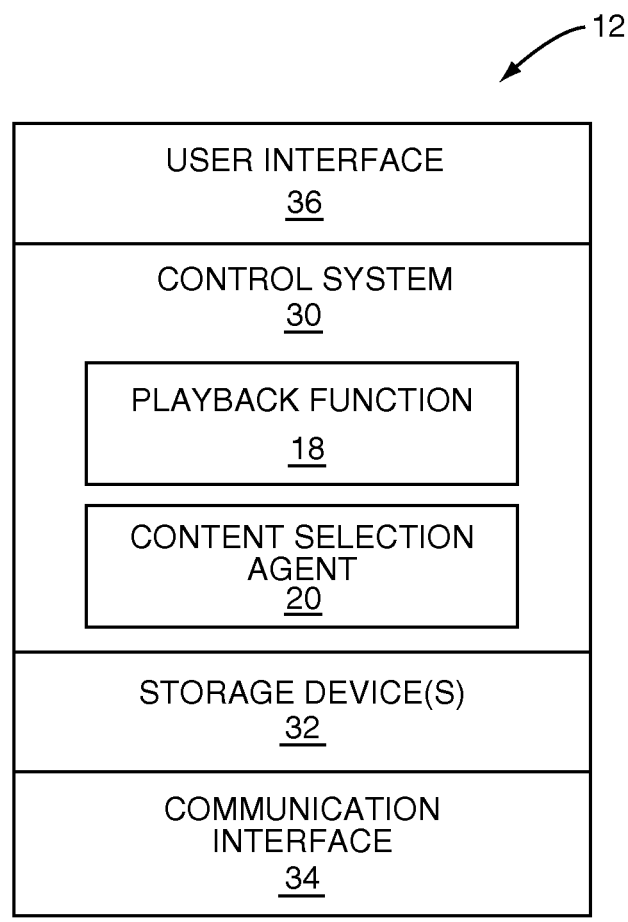
FIG. 5 is a block diagram of an exemplary embodiment of the media player of FIG. 1.

FIG. 5 is a block diagram of the media player 12 of FIG. 1 according to an exemplary embodiment of the present invention. In general, the media player 12 includes a control system 30, which includes the playback function 18 and the content selection agent 20. The playback function 18 and the content selection agent 20 may each be implemented in software, hardware, or a combination of software and hardware. The media player 12 also includes one or more digital storage devices 32 such as hard disk drives, optical storage devices, memory, or the like. The digital storage devices 32 operate to store the content database 22, the event profiles database 24, and the path profiles database 26. The media player 12 also includes a communication interface 34 capable of communicatively coupling the media player 12 to the network 16 (FIG. 1). The communication interface 34 may also provide communication with one or more peripheral devices to obtain stimuli such as, for example, location from a GPS peripheral device. The media player 12 also includes a user interface 36, which may include components such as a display, one or more user input devices, speakers, and the like.

Figure 6:
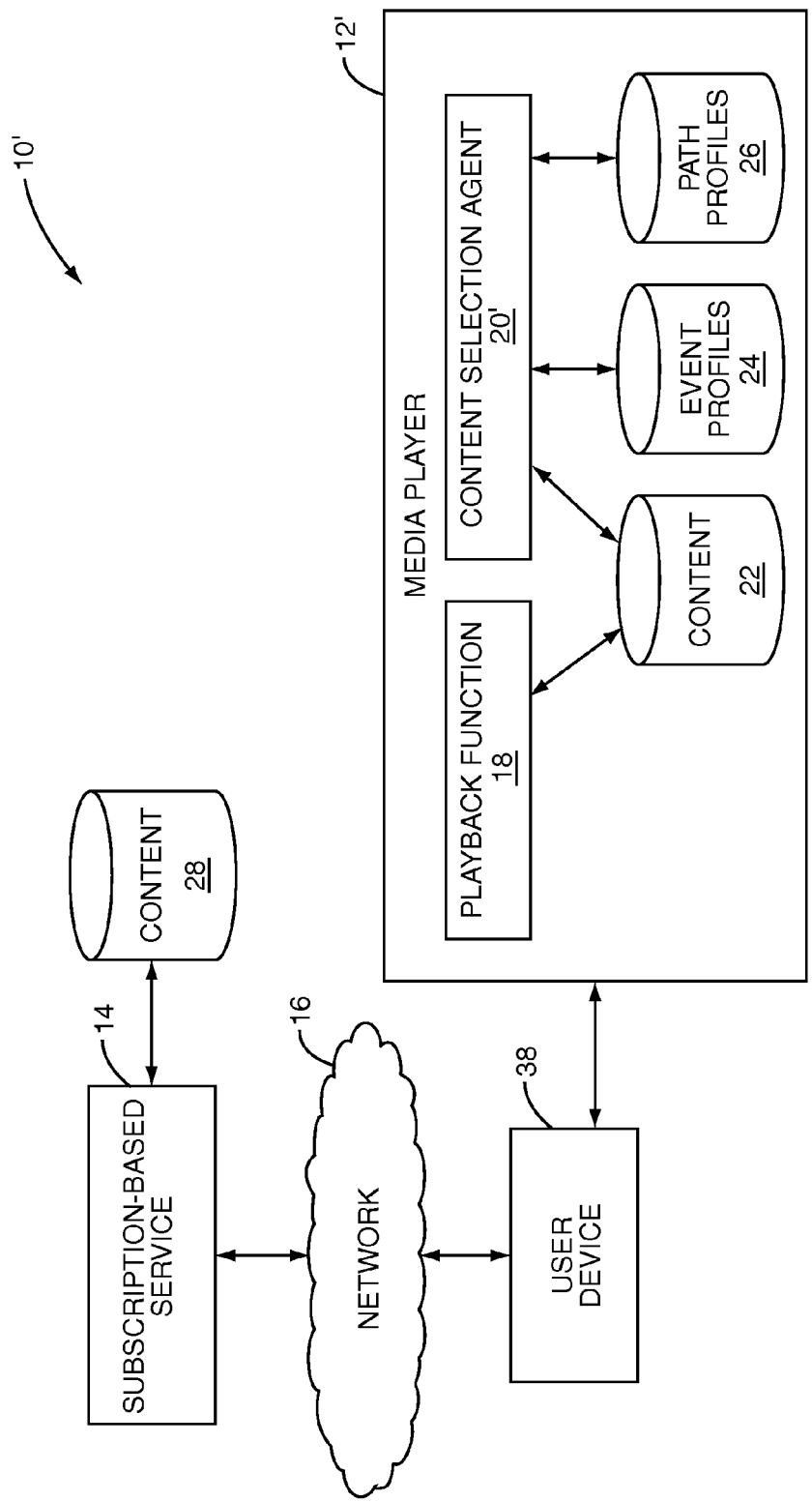
FIG. 6 illustrates a system according to a second embodiment of the present invention.

FIG. 6 illustrates the system 10' according to another embodiment of the present invention. Generally, in this embodiment, the media player 12' does not have a direct connection to the network 16. More specifically, as discussed above, events are used to trigger content selection paths for the purpose of selecting media content. The media content selections are provided to a user device 38 during a synchronization process. The user device 38 may be, for example, a personal computer. During the synchronization process, the media player 12' is communicatively coupled to the user device 38 via, for example, a wired or local wireless communication link. Thereafter, the user device 38 obtains the media content selections from the subscription-based service 14 and provides the content to the media player 12' during the same or a subsequent synchronization process.

Note that, in this embodiment, any stimuli requiring access to a remote source may not be used. For example, since news reports and some weather information are provided by remote sources, they may not be used. Alternatively, the media player 12' may request these types of stimuli from the user device 38, where the user device obtains the stimuli and provides the stimuli to the media player 12' during the same or a subsequent synchronization process. Further, for content selection paths requiring external information such as, for example, Billboard charts, the external information may be obtained by the user device 38 and provided to the media player 12' during a synchronization process.

In another embodiment, the events and content selection paths may be used by the media player 12' to select content from a content collection of the user stored on the user device 38 rather than selecting content to obtain from the subscription-based service 14. More specifically, content selection paths may be defined to step through content in the user's own media content collection stored on the user device 38. Thus, when associated events occur, the content selection paths are triggered to select content from the user's media collection to transfer to the media player 12' during the next or a current synchronization process.

Regarding the embodiments of both FIG. 1 and FIG. 6, the events and content selection paths may additionally or alternatively be used to step through content stored in the content database 22 of the media player 12, 12'. More specifically, the content selection paths may be limited to content stored locally on the media player 12, 12'. When the associated events occur, the content selection paths are triggered to select content from the content database 22 for playback at that time. The selections may be provided as suggestions where the user is enabled to select whether to ignore the suggestions or begin playback. Alternatively, playback of the content selections may begin automatically.

Figure 7:
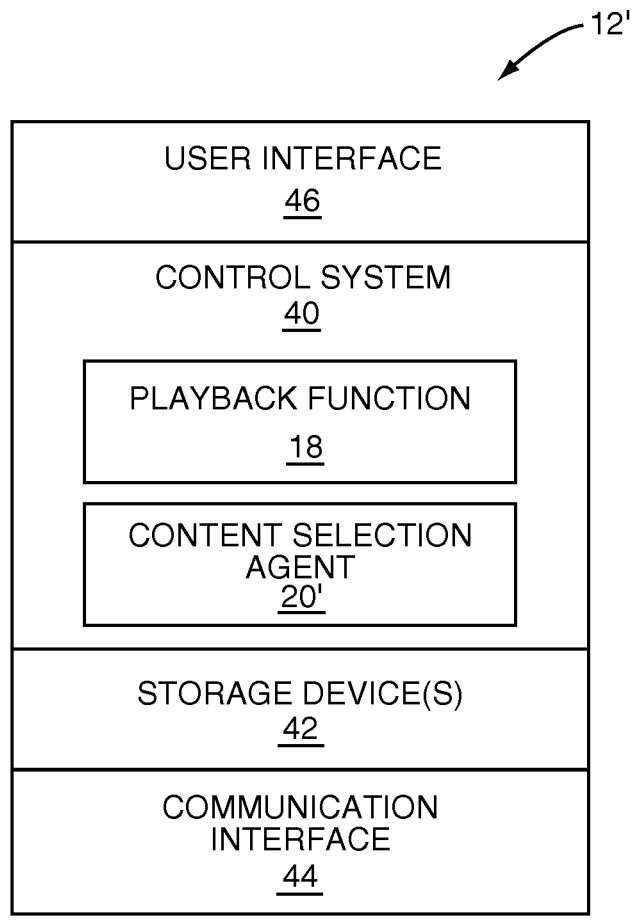
FIG. 7 is a block diagram of an exemplary embodiment of the media player of FIG. 6.

FIG. 7 is a block diagram of the media player 12' according to an exemplary embodiment of the present invention. In general, the media player 12' includes a control system 40, which includes the playback function 18 and the content selection agent 20'. The playback function 18 and the content selection agent 20' may each be implemented in software, hardware, or a combination of software and hardware. The media player 12' also includes one or more digital storage devices 42 such as hard disk drives, optical storage devices, memory, or the like. The digital storage devices 42 operate to store the content database 22, the event profiles database 24, and the path profiles database 26. The media player 12' also includes a communication interface 44 capable of communicatively coupling the media player 12' to the user device 38 for synchronization (FIG. 6). The media player 12' also includes a user interface 46, which may include components such as a display, one or more user input devices, speakers, and the like.

Figure 8:
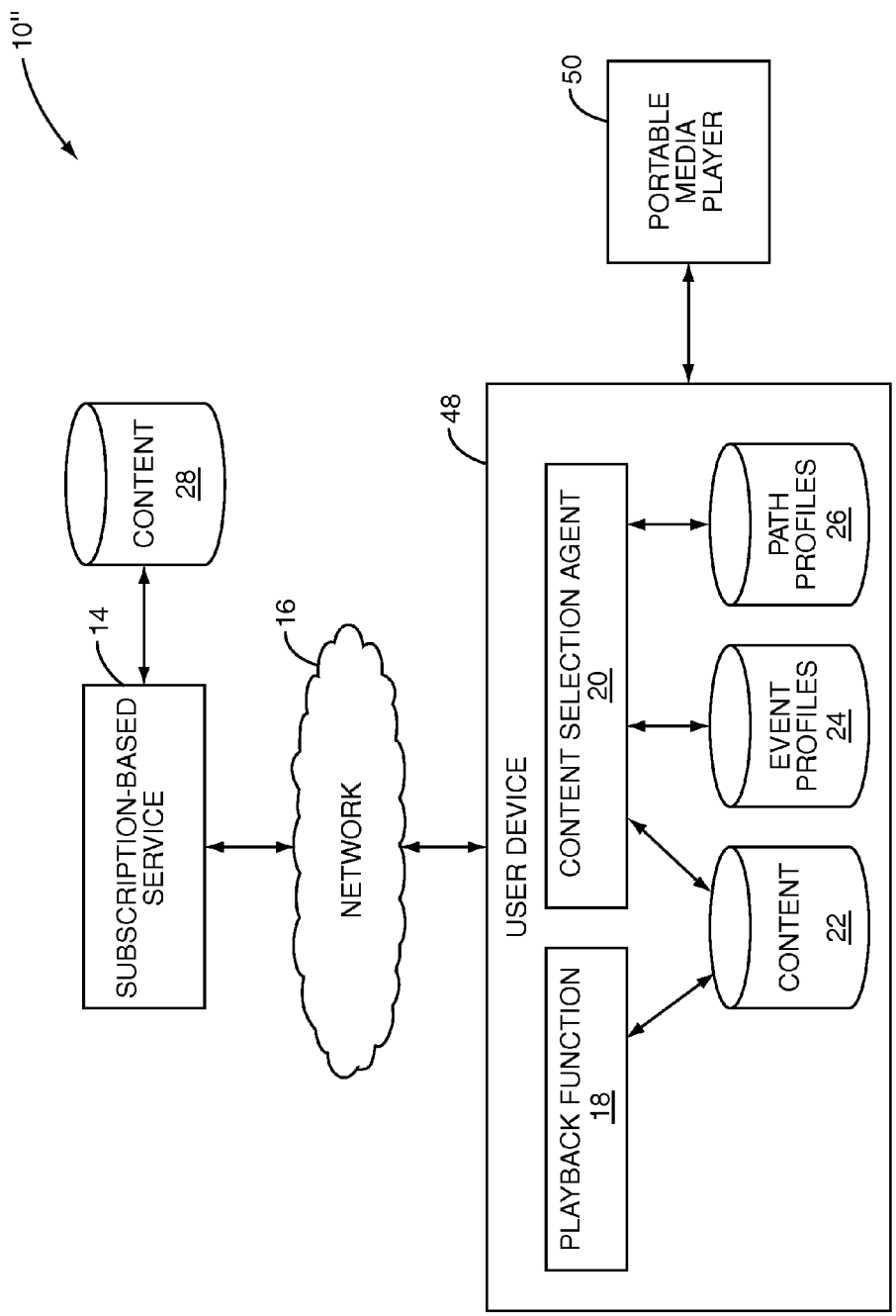
FIG. 8 illustrates a system according to a third embodiment of the present invention.

FIG. 8 illustrates the system 10" according to a third embodiment of the present invention. In this embodiment, the content selection agent 20, the content database 22, the event profiles database 24, and the path profiles database 26 are implemented on a user device 48 such as a personal computer or the like. Based on the events and content selection profiles, the content selection agent 20 selects content to be transferred to a portable media player 50 during a current or subsequent synchronization process. The portable media player 50 may be, for example, an Apple iPod® or the like. Note that synchronization may be used as an additional stimulus for defining events.

Figure 9:
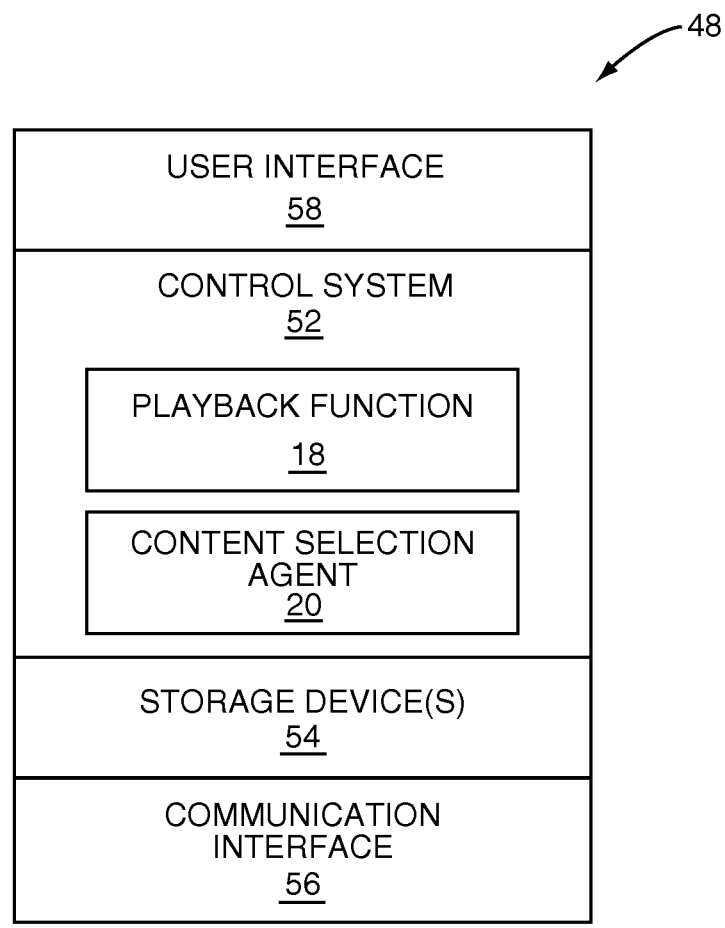
FIG. 9 is a block diagram of an exemplary embodiment of the user device of FIG. 8.

FIG. 9 is a block diagram of the user device 48 according to an exemplary embodiment of the present invention. In general, the user device 48 includes a control system 52, which includes the playback function 18 and the content selection agent 20. The playback function 18 and the content selection agent 20 may each be implemented in software, hardware, or a combination of software and hardware. The user device 48 also includes one or more digital storage devices 54 such as hard disk drives, optical storage devices, memory, or the like. The digital storage devices 54 operate to store the content database 22, the event profiles database 24, and the path profiles database 26. The user device 48 also includes a communication interface 56 capable of communicatively coupling the user device 48 to the portable media player 50 for synchronization and communicatively coupling the user device 48 to the network 16 (FIG. 8). The user device 48 also includes a user interface 58, which may include components such as a display, one or more user input devices, speakers, and the like.

Figure 10:
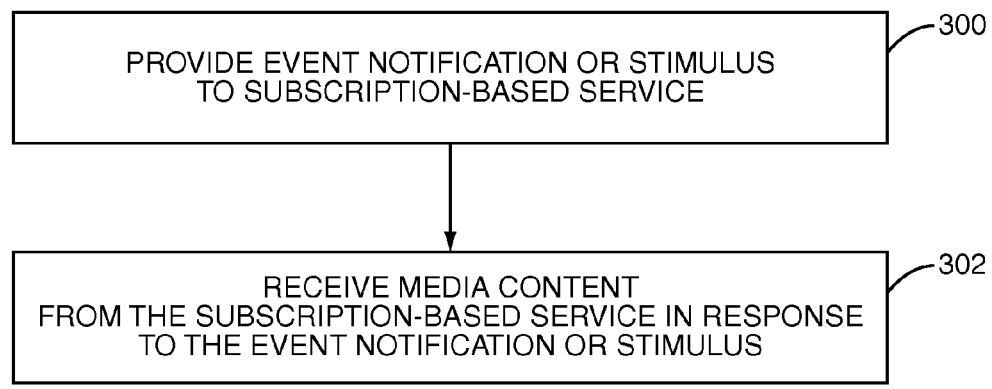
FIG. 10 illustrates the operation of the systems of FIGS. 1, 6, and 8 according to an alternative embodiment of the present invention.

While the embodiments of FIGS. 1, 6, and 8 describe the content selection agent 20, 20' being entirely implemented on the media player 12, 12' and the user device 48, the present invention is not limited thereto. For example, FIG. 10 illustrates the operation of the systems 10, 10', and 10" according to an alternative embodiment of the present invention. First, discussing this alternative embodiment with respect to the system 10 of FIG. 1, the content selection agent 20 provides either notification of an event or one or more stimuli to the subscription-based service 14 (step 300). In response, the subscription-based service 14 selects media content based on the event or stimuli and provides the selected media content to the media player 12. The media player 12 receives the selected media content and stores the selected media content in the content database 22 (step 302). Likewise, for the system 10" of FIG. 8, the content selection agent 20 provides either notification of an event or one or more stimuli to the subscription-based service 14 (step 300) and receives selected media content from the subscription-based service 14 (step 302).

With respect to the system 10' of FIG. 6, the content selection agent 20' may provide a notification of an event or one or more stimuli to the subscription-based service 14 via the user device 38 (step 300). In response, the subscription-based service 14 selects media content based on the event or stimuli and provides the selected media content to the user device 38. Thereafter, in the same synchronization process or a subsequent synchronization process, the media player 12' receives the selected content from the user device 38 (step 302).

In order to select the media content in response to a notification of an event, the subscription-based service 14 may select the media content by triggering an associated content selection path. Alternatively, the subscription-based service 14 may maintain a static or dynamic playlist for each of a number of events. Thus, in response to a notification of an event, the subscription-based service 14 may return the media content from the associated static or dynamic playlist.

For example, the subscription-based service 14 may maintain a static or dynamic playlist for the location of Las Vegas. Thus, when the current location of the media player 12, 12' is in Las Vegas, the content selection agent 20, 20' may provide notification of the event to the subscription-based service 14. In response, the subscription-based service 14 may provide a number of content selections identified by the playlist to the media player 12, 12'. As another example, the subscription-based service 14 may maintain a static or dynamic playlist for a high heart rate event. Thus, when the heart rate of the user of the media player 12 is greater than a defined threshold, the content selection agent 20 may notify the subscription-based service 14 of the high heart rate event. In response, the subscription-based service 14 may provide a number of content selections identified by the playlist to the media player 12. As a final example, the subscription-based service 14 may maintain a static or dynamic playlist for Seattle, Wash. including a number of songs or albums by local independent grunge bands. Thus, when the current location of the media player 12 is Seattle or when the media player 12' synchronizes to the user device 38 while in Seattle, the content selection agent 20 may notify the subscription-based service 14 of the event. In response, the subscription-based service 14 provides the content selections identified by the playlist to the media player 12 or to the media player 12' via the user device 38.

In order to select the media content in response to one or more stimuli from the content selection agent 20, 20', the subscription-based service 14 may use events and content selection paths in the manner described herein. Alternatively, the subscription-based service 14 may maintain a static or dynamic playlist for each of a number of stimuli. Thus, in response to a stimulus, the subscription-based service 14 may return the media content from the associated static or dynamic playlist.

Those skilled in the art will recognize improvements and modifications to the preferred embodiments of the present invention. All such improvements and modifications are considered within the scope of the concepts disclosed herein and the claims that follow.

What is claimed is:

1. A method comprising:
 detecting an occurrence of an event associated with a content selection path, wherein the content selection path defines a set of media content and includes a plurality of steps, and wherein each of the steps identifies ones of the set of media content; and
 traversing the content selection path in response to the occurrence of the event to a next step of the plurality of steps in the content selection path to identify media content selections from the set of media content.

2. The method of claim 1 further comprising obtaining the media content selections from a subscription-based service.

3. The method of claim 1 further comprising obtaining the media content selections from an associated user device during a synchronization process.

4. The method of claim 3 further comprising defining the content selection path such that the set of media content is limited to media content in a user media collection hosted by the associated user device.

5. The method of claim 1 further comprising defining the content selection path such that the set of media content defined by the content selection path is limited to locally stored media content and the media content selections are selections from the locally stored media content.

6. The method of claim 1 wherein the event is defined based on at least one stimulus, and detecting the occurrence of the event comprises detecting the at least one stimulus.

7. The method of claim 6 further comprising defining the event based on the at least one stimulus, the at least one stimulus selected from a group consisting of: a chronological-based stimulus, a location-based stimulus, a user-based stimulus, a network-based stimulus, a third-party stimulus, and a weather-based stimulus.

8. The method of claim 1 wherein a plurality of content selection paths including the content selection path are associated with the event, and the method further comprises:
 for each one of the plurality of content selection paths, traversing the one of the plurality of content selection paths in response to the occurrence of the event to a next step of a plurality of steps in the one of the plurality of content selection paths to identify initial media content selections; and
 combining the initial media content selections from each of the plurality of content selection paths to provide final media content selections.

9. The method of claim 8 wherein combining the initial media content selections from each of the plurality of content selection paths comprises filtering the initial media content selections from each of the plurality of content selection paths based on at least one criterion.

10. The method of claim 8 wherein combining the initial media content selections from each of the plurality of content selection paths comprises filtering the initial media selections from each of the plurality of content selection paths to remove duplicate selections.

11. The method of claim 1 wherein each of the plurality of steps in the content selection path comprises at least one of a plurality of media content popularity charts over a defined period of time, and
 wherein traversing the content selection path comprises traversing the content selection path to the next step in the content selection path such that the at least one of the plurality of media content popularity charts corresponding to the next step identifies the media content selections.

12. The method of claim 1 wherein each of the plurality of steps in the content selection path identifies at least one of a plurality of music albums, and
 wherein traversing the content selection path comprises traversing the content selection path to the next step in the content selection path such that the at least one of the plurality of music albums identified by the next step corresponds to the media content selections.

13. The method of claim 1 wherein each of the plurality of steps in the content selection path comprises at least one of a plurality of defined lists of media content, and
 wherein traversing the content selection path comprises traversing the content selection path to the next step in the content selection path such that the at least one of the plurality of defined lists of media content identifies the media content selections.

14. The method of claim 1 further comprising defining the event and the content selection path such that the event triggers the content selection path.

15. A system comprising:
 a communication interface communicatively coupling the system to a content source; and
 a control system associated with the communication interface and adapted to:
  detect an occurrence of an event associated with a content selection path, wherein the content selection path identifies a set of media content and comprises a plurality of steps, wherein each of the steps identifies ones of the set of media content;
  traverse the content selection path in response to the occurrence of the event to a next step of the plurality of steps in the content selection path to identify media content selections from the set of media content; and
  obtain the media content selections from the content source.

16. The system of claim 15 wherein the content source is a subscription-based service.

17. The system of claim 15 wherein the control system is further adapted to provide the media content selections to a portable media player during a synchronization process.

18. The system of claim 15 wherein the event is defined based on at least one stimulus, and the control system is further adapted to detect the occurrence of the event based on detection of the at least one stimulus.

19. The system of claim 18 wherein the at least one stimulus is selected from a group consisting of: a chronological-based stimulus, a location-based stimulus, a user-based stimulus, a network-based stimulus, a third-party stimulus, and a weather-based stimulus.

20. The system of claim 15 wherein the event is associated with a plurality of content selection paths including the content selection path, and the control system is further adapted to:
 for each one of the plurality of content selection paths, traverse the one of the plurality of content selection paths in response to the occurrence of the event to the next step of a plurality of steps in the one of the plurality of content selection paths to identify initial media content selections;
 combine the initial media content selections from each of the plurality of content selection paths to provide final media content selections; and
 obtain the final media content selections from the content source.

21. The system of claim 15 wherein each of the plurality of steps in the content selection path comprises at least one of a plurality of media content popularity charts over a defined period of time.

22. The system of claim 15 wherein each of the plurality of steps in the content selection path identifies at least one of a plurality of music albums.

23. The system of claim 15 wherein each of the plurality of steps in the content selection path comprises at least one of a plurality of defined lists of media content.

24. A portable media player comprising:
a communication interface of the portable media player configured to communicatively couple the portable media player to an associated user system during a synchronization process; and
a control system of the portable media player in communication with the communication interface and adapted to:
detect an occurrence of an event associated with a content selection path, wherein the content selection path defines a set of media content, and wherein the content selection path includes a plurality of steps, and wherein each of the steps identifies ones of a set of media content;
traverse the content selection path in response to the occurrence of the event to a next step of the plurality of steps in the content selection path to identify media content selections from the set of media content;
provide information that identifies the media content selections to the associated user system during a first synchronization process; and
receive the media content selections from the associated user system during the first synchronization process or a subsequent synchronization process.

25. The portable media player of claim 24 wherein the associated user device obtains the media content selections from a subscription-based service.

26. The portable media player of claim 24 wherein the associated user system obtains the media content selections from a user media collection hosted by the associated user system.

27. The portable media player of claim 24 wherein the event is defined based on at least one stimulus, and the control system is further adapted to detect the occurrence of the event based on detection of the at least one stimulus.

28. The portable media player of claim 27 wherein the at least one stimulus is selected from a group consisting of: a chronological-based stimulus, a location-based stimulus, a user-based stimulus, a network-based stimulus, a third-party stimulus, and a weather-based stimulus.

29. The portable media player of claim 24 wherein the event is associated with a plurality of content selection paths including the content selection path, and the control system is further adapted to:
for each one of the plurality of content selection paths, traverse the one of the plurality of content selection paths in response to the occurrence of the event to a next step of a plurality of steps in the one of the plurality of content selection paths to identify initial media content selections;
combine the initial media content selections from each of the plurality of content selection paths to provide final media content selections;
provide information identifying the final media content selections to the associated user system during a first synchronization process; and
receive the final media content selections from the associated user system during the first synchronization process or a subsequent synchronization process.

30. The portable media player of claim 24 wherein each of the plurality of steps in the content selection path comprises at least one of a plurality of media content popularity charts over a defined period of time.

31. The portable media player of claim 24 wherein each of the plurality of steps in the content selection path identifies at least one of a plurality of music albums.

32. The portable media player of claim 24 wherein each of the plurality of steps in the content selection path comprises at least one of a plurality of defined lists of media content.

33. A method comprising:
detecting an event at a media player based on at least one stimulus;
sending, by the media player, a notification of the event to a user device coupled to the media player;
sending, by the user device, the notification of the event to a subscription-based service, wherein the subscription-based service selects media content to provide to the media player based on the notification of the event; and
receiving, by the user device, the selected media content from the subscription-based service in response to the notification of the event.

34. The method of claim 33, wherein the at least one stimulus includes at least one of a network-based stimulus, a third-party stimulus, and a weather-based stimulus.

* * * * *